Aug. 11, 1942.   A. LYSHOLM   2,292,385
MULTISTAGE HYDRAULIC TORQUE CONVERTER
Filed Jan. 20, 1940
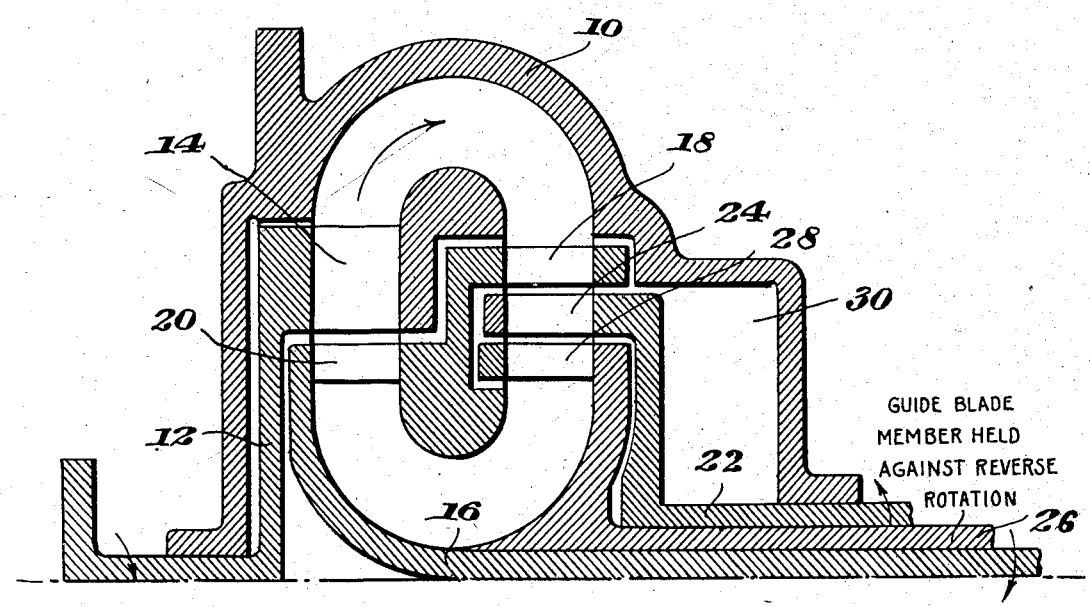

Patented Aug. 11, 1942

2,292,385

UNITED STATES PATENT OFFICE 2,292,385

MULTISTAGE HYDRAULIC TORQUE CONVERTER

Alf Lysholm, Stockholm, Sweden, assignor, by mesne assignments, to Jarvis C. Marble, Leslie M. Merrill, and Percy H. Batten, trustees Application January 20, 1940, Serial No. 314,769
In Switzerland January 23, 1939

3 Claims. (Cl. 60—54)

The present invention relates to torque multiplying hydraulic converters and has particular reference to such converters of the kind in which turbine wheels adapted to rotate in opposite directions are arranged in the same closed circuit or path of flow for the working liquid.

More particularly, the present invention has for its object the provision of an improved form of converter apparatus of the kind disclosed in my co-pending application Serial No. 156,113 filed July 28, 1937, now abandoned, and in my co-pending application Serial No. 385,047, filed March 25, 1941 as a continuation-in-part with respect to said application, Serial No. 156,113, and this application.

In numerous specific applications for which converter apparatus of the general kind under discussion is useful, it is highly desirable to have a particularly high starting torque characteristic for the secondary or driven member, and also to have relatively high operating efficiency over a comparatively wide range of secondary speeds. Furthermore, depending upon the power delivering characteristics of the prime mover at different speeds it is also desirable in certain instances to have the characteristics of the converter, from the standpoint of the torque which it will absorb, such that the prime mover will be loaded more at low speeds of the secondary member than at high speeds of the secondary member.

As an example of this there is the case of a vehicle drive where the power plant for the vehicle is a relatively flexible internal combustion engine having a relatively wide speed range. If in such an installation the engine is loaded more when the secondary or driven shaft is stationary than at other times, this will aid in preventing the engine from turning at excessive speed or racing when the vehicle is started or moving at low speed.

If the loading of the engine, due to the characteristics of the converter, becomes less as the vehicle speed increases, this characteristic enables the engine speed to be increased from a moderate speed at start of the vehicle to a relatively higher speed as the vehicle speed rises. Thus with a converter having such a torque absorption characteristic it is possible to make most advantageous use of the flexible speed characteristics of the engine.

It is characteristic of single rotation converters, that is, converters in which all of the turbine or driven blading rotates in the same direction as the pump or driving blades and in which the last stage of turbine blading delivers the working liquid to the inlet of the pump, that the converter provides a higher torque absorbing characteristic at stall or low speeds of the driven member than at higher speeds of that member. On the other hand, the double rotation converter, having oppositely rotating turbine or driven wheels and discharging working liquid from an oppositely rotating stage to the inlet of the pump, provides the opposite kind of torque absorbing characteristic, tending to permit the engine to race at stall or low speeds of the driven member and to reduce its speed as the speed of the driven member increases. The double rotation type of converter is highly desirable from the standpoint of providing high torque multiplication at stall but this advantage in the forms of double rotation converter heretofore proposed has been more than offset by the accompanying undesirable torque absorbing characteristics.

In accordance with the present invention a novel form of double rotation torque converter is provided which enables extremely high starting torque to be obtained and which further provides the advantageous torque absorbing characteristic of a single rotation converter delivering working liquid from a forwardly rotating turbine stage to the pump.

The manner in which these desirable characteristics are attained may best be understood from the ensuing portion of this specification, reference being had to the accompanying drawing in which is shown in more or less diagrammatic longitudinal half section, one form of converter apparatus for carrying the invention into effect.

Referring now to the drawing, the converter shown comprises a casing 10 within which is mounted a primary or pump member 12 carrying a ring of pump blades 14 and adapted to be driven by the prime mover. A secondary or driven member 16, the blading of which is arranged to cause the member to rotate in the same direction as the pump, provides a first stage of turbine blades 18 which receives the working liquid discharged from pump blades 14 and a second stage of turbine blades 20 located to discharge working liquid to the inlet of the pump. A second driven or secondary member 22 carries a ring or stage of turbine blades 24, these latter blades being arranged to cause member 22 to rotate in a direction opposite the direction of rotation of the pump blades 14 and the turbine blades 18. Reaction member 26, which is held against rotation in a direction opposite that in which the pump member rotates, carries a ring or stage of reaction or guide blades 28 and as will be observed from the drawing the arrangement is such that working liquid discharged from the first stage of forwardly rotating turbine blades passes directly to the reversely rotating blades 24 and from the latter through the guide blade stage 28 to the second forwardly rotating stage 20.

For reasons hereinafter to be explained the reversely rotating stage is advantageously so constructed that it can be made ineffective as a power transmitting agency, and in the embodiment illustrated this is effected by mounting the sleeve portion of member 22 slidably on the sleeve portion of reaction member 26 so that the blades 24 can be withdrawn from the working circuit into the recess 30 provided in the housing 10.

The operation of this apparatus is as follows: Let it be assumed that the apparatus is employed for driving a vehicle, the driven members 16 and 22 being connected in any suitable fashion to transmit power to the driving wheels of the vehicle. Further, let it be assumed that the vehicle is standing still. If then the pump is operated by the engine, the apparatus will produce a high degree of torque multiplication since blades 18 and 24 act as reaction members with respect to each other and the guide blades 28 act as reaction members with respect to blades 24 and 20. Also, under the conditions assumed, the blades 20 are stationary and due to their angularity deliver the working liquid to the pump at an angle producing the maximum desired load on the pump for any given pump speed.

If, now, the vehicle starts to move under the influence of the applied torque and the turbine members 16 and 22 commence to rotate in opposite directions, the following effects are produced.

The efficiency of operation rises relatively very rapidly as the speeds of the driven members increase, since it is fundamental to this general type of apparatus that the efficiency is a function of the sum of the squares of the relative blade speeds and the relative blade speed between the blades 18 and 24, which rotate in opposite directions, is of course double what it would be if one of these members were stationary as would be the case in a single rotation converter. Consequently, relatively high efficiency of operation is obtained at a lower vehicle speed than would be the case with a single rotation converter.

At the same time, as the speeds of the driven elements increase the blades 20 commence to revolve in the same direction as the pump. This in turn alters the relative inlet angle at which the working liquid is delivered to the pump and the nature of this change is such as to decrease the torque absorbing characteristic of the pump This in turn permits the engine to be speeded up as the vehicle speed increases, to a speed greater than that which it can attain when the vehicle is standing still, and this in turn permits the application of progressively greater engine power to the vehicle as acceleration proceeds.

As above noted, the efficiency of operation reaches a relatively high value at a lower driven shaft speed than with a single rotation converter. Likewise, the efficiency begins to fall off at a lower speed than is the case with a single rotation converter. Therefore, in cases where it is desirable to have high efficiency over a relatively wide range of driven shaft speeds it is advantageous to be able to change the operation from double rotation at low speeds to single rotation at high speeds.

This is readily accomplished by making the reversely rotating stage of blading ineffective, since if this is done there remains operative in the circuit the two forwardly rotating stages 18 and 20, with the reaction stage 28 interposed between them. In the apparatus shown, this effect is readily accomplished by shifting the reversely rotating stage 24 out of the circuit.

From the foregoing description it will be apparent that in accordance with the present invention novel and highly desirable operating characteristics both as to efficiency of operation and application of torque to a driven member, as well as desirable torque absorbing characteristics, may be obtained by the provision of a relatively simple structure involving comparatively few stages of blading. It will be understood that the arrangement herein disclosed is for purposes of illustration only and within the scope of the invention as defined in the appended claims many structural variations are possible.

While in the present application the appended claims are restricted to the specific arrangement of blading herein disclosed, certain features of blading arrangement involving broader aspects of multiple stage converters employing reversely rotating turbine members form a part of the claimed subject matter of my co-pending application Serial No. 385,047.

What I claim is:

1. A torque multiplying hydraulic converter of the closed circuit type including in the working circuit a pump, a plurality of forwardly rotating turbine stages constructed to rotate in the same direction as the pump, at least one reversely rotating turbine stage constructed to rotate in the direction opposite that of the pump, and at least one guide stage, there being a reversely rotating stage and a guide stage located in the circuit between two forwardly rotating stages in the order named with respect to the direction of flow of the working fluid through the circuit, one of the forwardly rotating stages being located in the circuit to discharge to the inlet side of the pump and said guide stage being restrained against rotation in the direction opposite that of said pump.

2. A torque multiplying hydraulic converter of the closed circuit type having a working circuit consisting of a pump, two forwardly rotating turbine stages constructed to rotate in the same direction as the pump, a reversely rotating turbine stage constructed to rotate in a direction opposite that of the pump, and a guide stage, said reversely rotating turbine stage and said guide stage being located between the two forwardly rotating turbine stages in the order named, with respect to the direction of flow of working fluid in the circuit and the second forwardly rotating turbine stage discharging to the inlet side of the pump, said guide stage being restrained against rotation in a direction opposite that of said pump.

3. In a torque multiplying hydraulic converter of the type having a closed working circuit in which the flow of working liquid is substantially radially outward in a first portion of the circuit and substantially radially inward in a second portion of the circuit, including pump means located in said first portion of the circuit, a plurality of turbine stages including oppositely rotating stages located in said second portion of the circuit, a guide stage restrained against rotation in a direction opposite that of said pump means, said guide stage being located to be passed by the working liquid after it has passed said oppositely rotating turbine stages, and a forwardly rotating turbine stage located in said first portion of the circuit radially inwardly of said pump means and discharging thereto.

ALF LYSHOLM.